US012642176B2

(12) United States Patent
Thomas et al.

(10) Patent No.: US 12,642,176 B2
(45) Date of Patent: Jun. 2, 2026

(54) AIR SCREEN CLEANING SYSTEM FOR AGRICULTURAL VEHICLE

(71) Applicant: CNH Industrial America LLC, New Holland, PA (US)

(72) Inventors: Jeffrey Thomas, Gordonville, PA (US); Matthew Gyenes, Gordonville, PA (US)

(73) Assignee: CNH Industrial America LLC, New Holland, PA (US)

( * ) Notice: Subject to any disclaimer, the term of this patent is extended or adjusted under 35 U.S.C. 154(b) by 496 days.

(21) Appl. No.: 18/218,661

(22) Filed: Jul. 6, 2023

(65) Prior Publication Data

US 2025/0008873 A1 Jan. 9, 2025

(51) Int. Cl.
| | |
|---|---|
| *A01D 41/12* | (2006.01) |
| *A01D 41/127* | (2006.01) |
| *A01D 75/00* | (2006.01) |
| *F01P 11/12* | (2006.01) |

(52) U.S. Cl.
CPC ......... *A01D 41/1276* (2013.01); *A01D 75/00* (2013.01); *F01P 11/12* (2013.01)

(58) Field of Classification Search
CPC ................ A01D 41/1276; A01D 75/00; A01D 41/1252; B60K 11/04; B60K 11/08; B60S 1/62; F01P 11/12; F01P 1/06
See application file for complete search history.

(56) References Cited

U.S. PATENT DOCUMENTS

| | | | |
|---|---|---|---|
| 3,155,473 A | 11/1964 | McNeil | |
| 5,676,197 A | 10/1997 | Diebold et al. | |
| 12,144,285 B2 * | 11/2024 | Neyrinck ................. | F01P 11/12 |
| 2008/0016833 A1 * | 1/2008 | Sheidler ............. | A01D 41/1252 |
| | | | 55/385.3 |
| 2008/0257531 A1 * | 10/2008 | D'hondt ................... | F01P 11/12 |
| | | | 165/104.34 |
| 2017/0096931 A1 | 4/2017 | Beichner et al. | |
| 2017/0107893 A1 | 4/2017 | Davenport et al. | |

FOREIGN PATENT DOCUMENTS

CN 215454014 U 1/2022

* cited by examiner

*Primary Examiner* — Syed O Hasan
(74) *Attorney, Agent, or Firm* — Selene Haedi

(57) ABSTRACT

An aspiration system of an agricultural vehicle includes a perforated screen that is configured to be positioned adjacent a fan-cooled fluid cooler, and an air delivery device positioned on one side surface of the perforated screen. The air delivery device includes a series of openings facing the perforated screen for directing air through the perforated screen to dislodge debris on the perforated screen.

14 Claims, 6 Drawing Sheets

AIR SCREEN CLEANING SYSTEM FOR AGRICULTURAL VEHICLE

BACKGROUND OF THE INVENTION

1. Field of the Invention

The present invention relates to agricultural harvesters such as combines, and, more particularly, to the air screen cleaning system.

2. Description of the Related Art

As described in U.S. Patent App. No. 2017/0096931 ('931 Publication), which is incorporated by reference herein in its entirety, a combine harvester can include a cooling system for cooling an internal combustion (IC) engine, exhaust and combustion gases associated with the engine, a hydraulic circuit, an air conditioning (A/C) circuit associated with the operator cab, and/or other fluid carrying components onboard the combine.

The cooling system can include a housing, and a plurality of cooling units arranged in a side-to-side manner within the housing, transverse to a fore-aft direction of the combine. Each cooling unit generally includes a screen, a fluid cooler and a fan. The screen is at the inlet of the corresponding cooling unit adjacent to the grain tank, and the fan is at the outlet of the corresponding cooling unit adjacent to the IC engine. The inlet allows air to be drawn into the respective cooling unit, and the outlet allows air to be exhausted from the respective cooling unit.

Each screen functions as a coarse filter to filter out dust, chaff, etc. from entering the corresponding cooling unit. Each screen may be either stationary or capable of rotating. Each screen can include a cleaner, in the form of a wand that is a part of an aspiration system, which removes chaff, dirt, etc. from the screen as the screen or wand rotates. Each screen can also include a brush, which is either stationary or movable, that further removes the chaff and dirt from the screen. Despite the wand and/or brush, there are instances where those cleaning features may not adequately clean the screen, and the perforations in the screen remain blocked by the chaff, dirt, etc.

Described herein is an additional mechanism that distributes a stream of high velocity air flow over the screen, that acts in combination with the wand, to further enhance cleaning of the screen.

It is noted that the features described in this section are provided for the purpose of background information, and are not necessarily admitted prior art.

SUMMARY OF THE INVENTION

According to one aspect of the invention, an aspiration system of an agricultural vehicle includes a perforated screen that is configured to be positioned adjacent a fan-cooled fluid cooler, and an air delivery device positioned on one side surface of the perforated screen. The air delivery device includes a series of openings facing the perforated screen for directing air through the perforated screen to dislodge debris on the perforated screen.

BRIEF DESCRIPTION OF THE DRAWING FIGURES

The above-mentioned and other features and advantages of this invention, and the manner of attaining them, will become more apparent and the invention will be better understood by reference to the following description of an embodiment of the invention taken in conjunction with the accompanying drawings, wherein.

Figure 5:
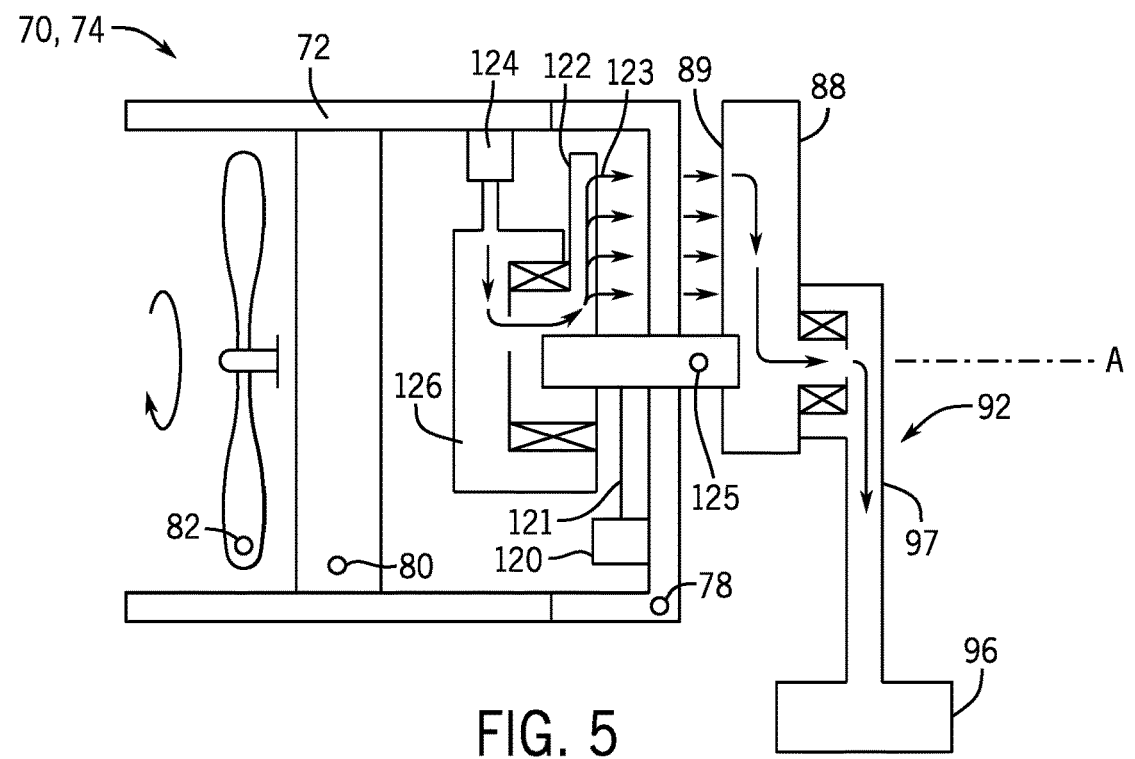
FIG. 5 depicts a schematic cross-sectional side elevation view of a single cooling unit of the cooling package of FIGS. 2-4.
Figure 6:
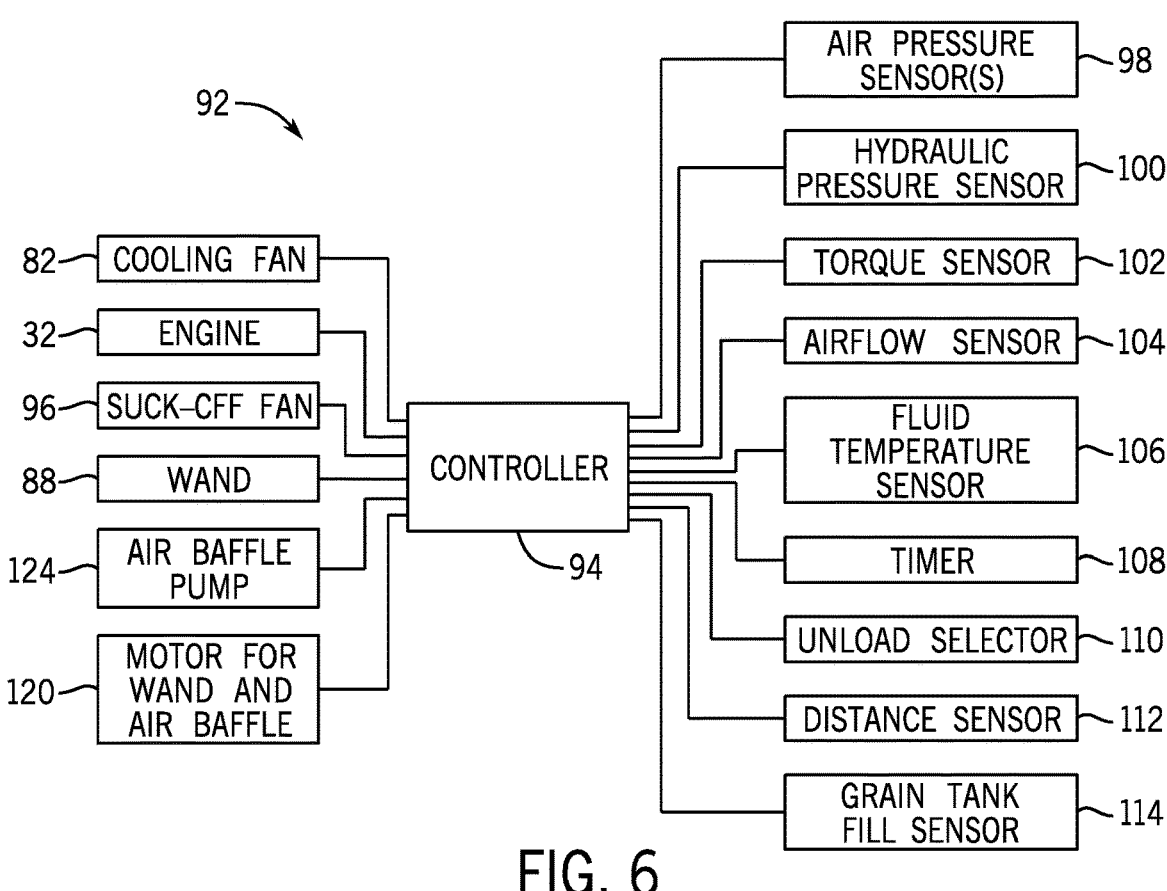
Figure 7B:
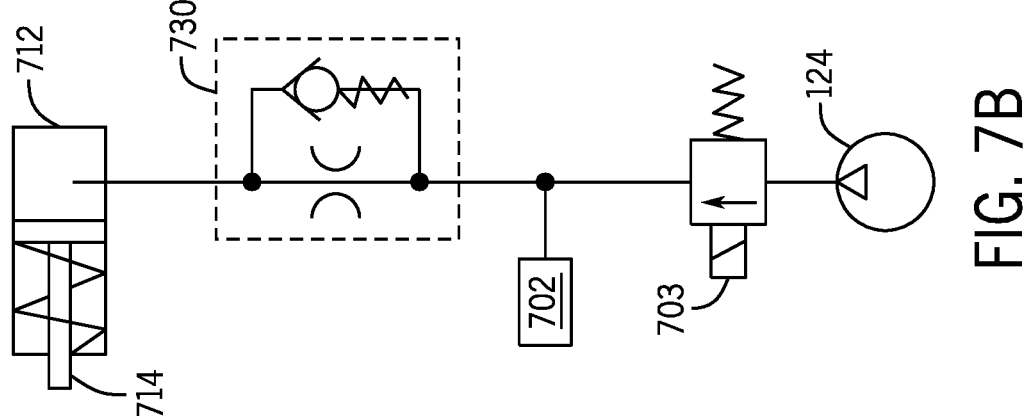
Figure 7A:
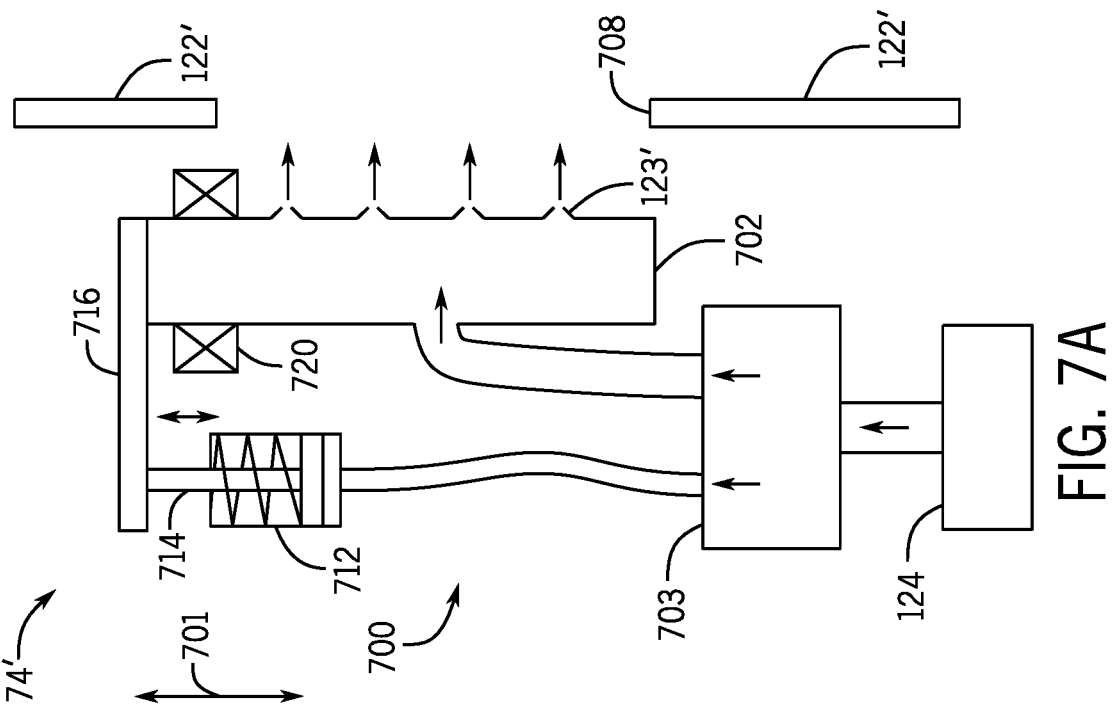

FIG. 6 schematically illustrates an embodiment of an aspiration system of the present invention used with the cooling system of FIGS. 1-5;

FIG. 7A depicts an optional system for moving the nozzles of the air baffle of the aspiration system of FIG. 5;

FIG. 7B depicts a schematic view of the optional system of FIG. 7A; and

Figure 8:
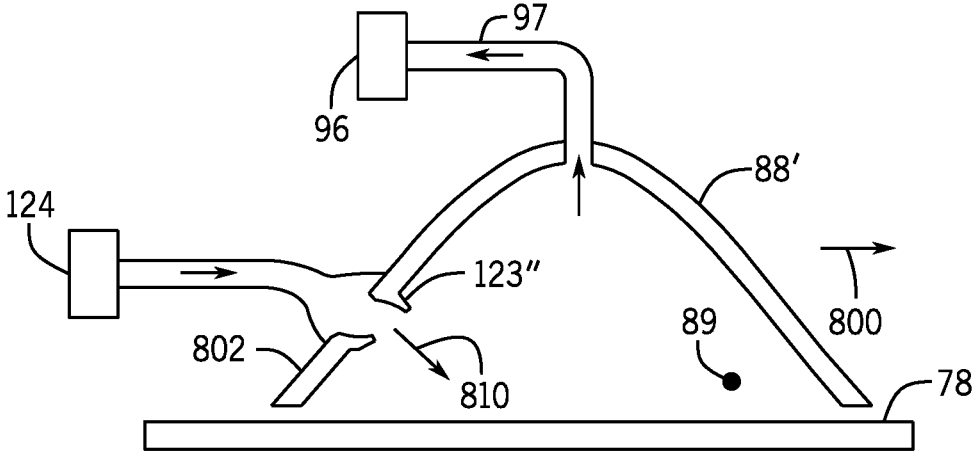

FIG. 8 depicts an alternative wand for the aspiration system of the cooling system.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
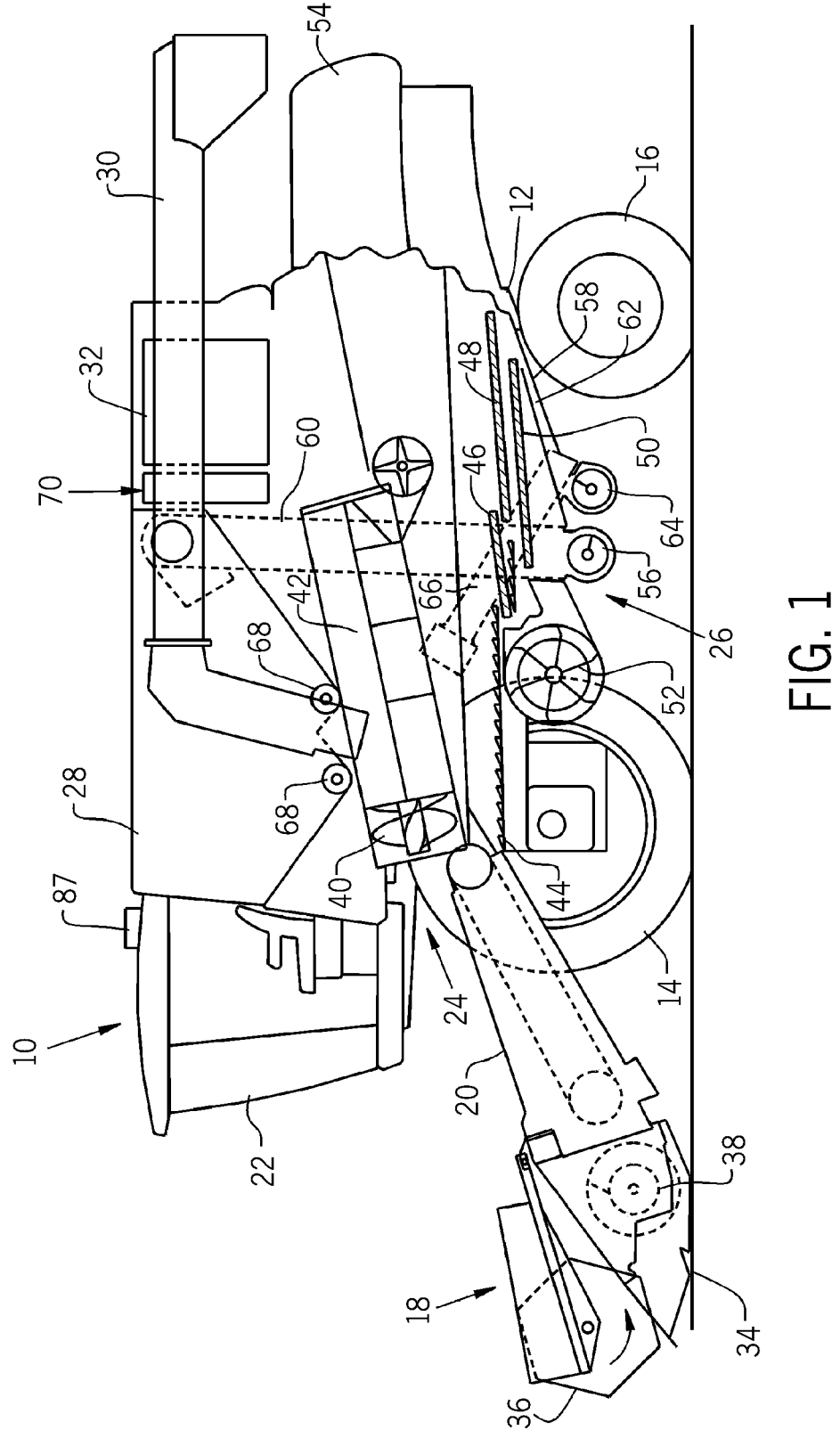
FIG. 1 is a side view of an embodiment of an agricultural vehicle in the form of a combine, which includes an embodiment of a cooling system.
Figure 2:
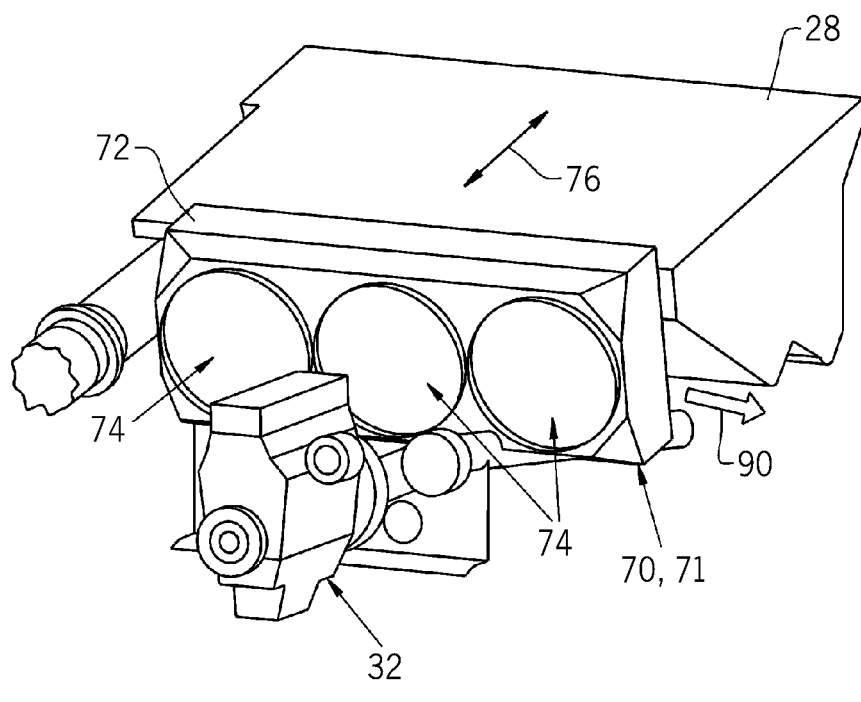
FIG. 2 is a side view of a portion of the internal components of the combine shown in FIG. 1, including the grain tank, IC engine and cooling system shown in FIG. 1.
Figure 3:
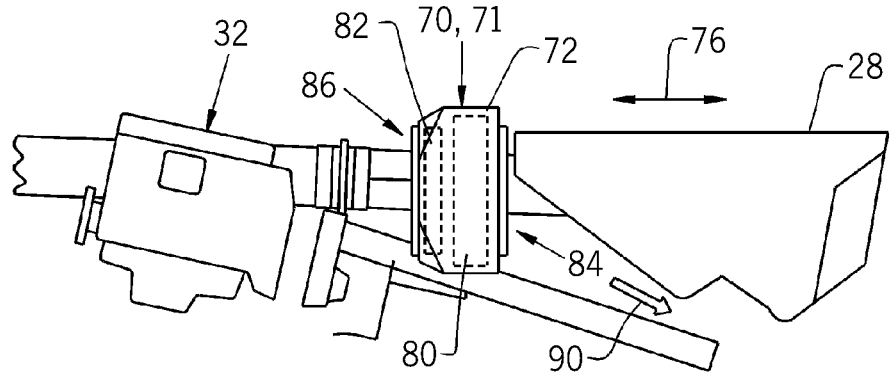
FIG. 3 is a side view of the internal components shown in FIG. 2.
Figure 4:
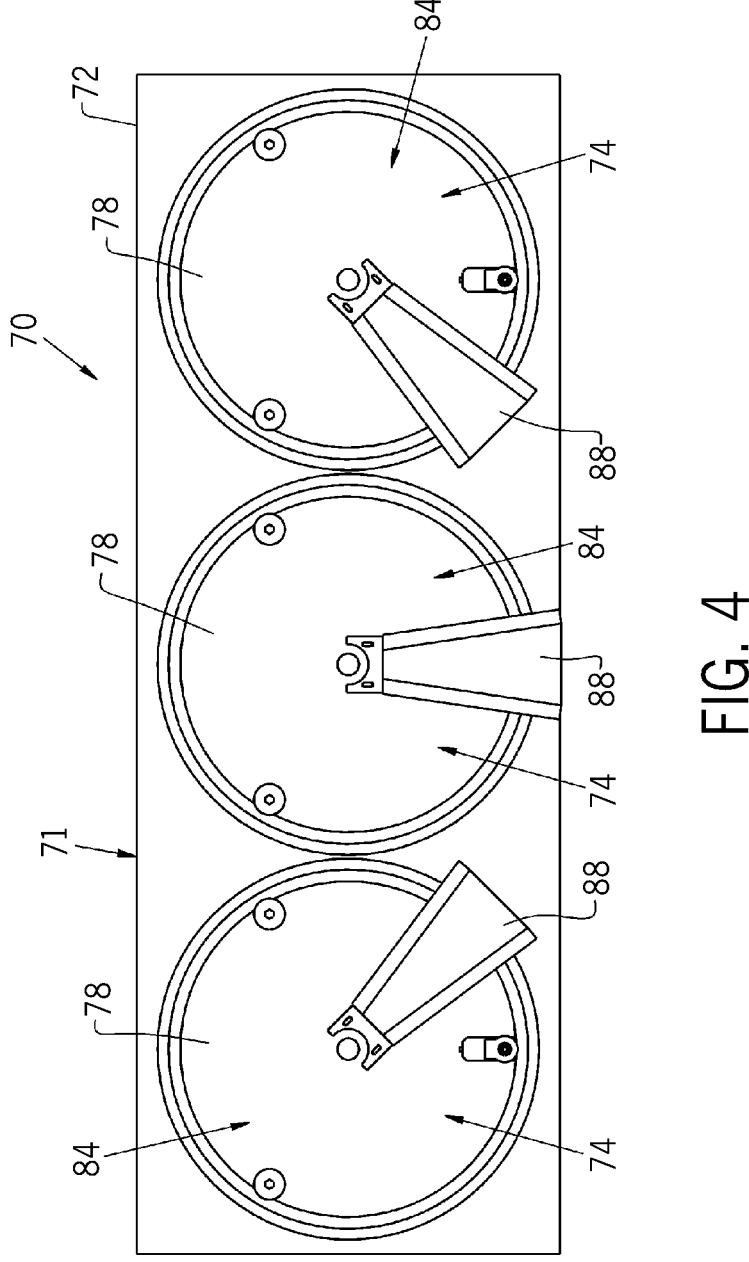
FIG. 4 is a side view of the cooling package shown in FIGS. 2 and 3.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel internal combustion engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

According to an aspect of the present invention, combine 10 includes a cooling system 70 for cooling at least one component onboard the combine 10. For example, the cooling system 70 can be used to cool the IC engine 32, exhaust and combustion gases associated with the IC engine 32, a hydraulic circuit (not shown), an air conditioning (A/C) circuit 87 associated with the operator cab 22, and/or other fluid carrying components onboard the combine 10.

The cooling system 70 is in the form of an integral cooling package 71 that is positioned between the IC engine 32 and the grain tank 28. The cooling package 71 includes a housing 72, and a plurality of cooling units 74 arranged in a side-to-side manner within the housing 72, transverse to a fore-aft direction 76 of the combine 10. It should be understood that the cooling system 70 may include any number of cooling units 74, and the cooling units 74 may be arranged in any manner within the housing 72, such as in a front-to-back manner within the housing, i.e., in the fore-aft longitudinal direction.

Each cooling unit 74 generally includes a screen 78, a fluid cooler 80 and a fan 82. The screen 78 is at the inlet 84 of the corresponding cooling unit 74 adjacent to the grain tank 28, and the fan 82 is at the outlet 86 of the corresponding cooling unit 74 adjacent to the IC engine 32. The inlet 84 allows air to be drawn into the respective cooling unit 74, and the outlet 86 allows air to be exhausted from the respective cooling unit 74.

In the illustrated embodiment, the IC engine 32 is located rearward of the grain tank 28. Thus, the inlet 84 is located at the front surface (not numbered) of the cooling package 71 which faces toward the rear surface the grain tank 28. Conversely, the outlet 86 is located at the rear surface (not numbered) of the cooling package 71 which faces toward the front surface the IC engine 32. In the event that the IC engine 32 is located below or in front of the grain tank 28, then the inlet/front surface of the cooling package 71 can face toward the bottom or front surface, respectively, of the grain tank 28.

Each fluid cooler 80 is configured for cooling a corresponding type of fluid, such as a cooling fluid for an IC engine, hydraulic oil in a hydraulic power circuit, a refrigerant fluid used in an A/C circuit, etc. The fluid coolers can be configured with any combination of cooling circuits, and can all be the same, partially the same, or all different. In the event that one of more of the fluid coolers 80 are configured different relative to each other, then those cooling circuits are likely independent from each other. However, if multiple fluid coolers are configured the same, then those cooling circuits can be independent from each other or can be coupled together in series or parallel. In the illustrated embodiment, the three fluid coolers 80 are each assumed to be configured differently from each other and independent from each other. One fluid cooler 80 may be configured as a radiator for the IC engine 32, another fluid cooler 80 may be configured as an oil cooler for a hydraulic circuit, and the third fluid cooler 80 may be configured as a heat exchange coil for an A/C circuit 87 associated with the operator cab 22. The fluid coolers 80 can also be configured as other types of fluid coolers, such as an intercooler or an aftercooler.

Each screen 78 functions as a coarse filter to filter out dust, chaff, etc. from entering the corresponding cooling unit 74. Each screen 78 may be configured to rotate, or each screen 78 may be stationary and fixed to housing 72. Each screen 78 can include a cleaner 88, in the form of a wand 88 that is a part of an aspiration system 92, which removes chaff, dirt, etc. from the screen. The screen 78 and/or its wand 88 may be rotatable. The screen 78 gets cleaned by wand 88 upon rotation of either screen 78 or wand 88. Each screen 78 can also be configured to be movable toward and away from the respective cooling unit 74 for cleaning of and access to the respective cooling unit 74. The screen 78 can be manually movable or can be movable using a suitable powered actuator, such as a pneumatic actuator or an electric motor and gear arrangement.

Each cooling fan 82 is configured for moving air through the respective cooling unit 74 for effective liquid-to-air cooling. The rotational speed, blade pitch angle, etc. can of course vary, depending on the particular needs of the cooling unit 74. The air flow on the outlet side of the cooling unit 74 can be used for cooling and/or cleaning an area onboard the combine 10. For example, air from the outlet 86 of the cooling unit 74 configured as a radiator can be used to both cool, clean and inhibit buildup of dirt and chaff on the IC engine 32.

One or more of the cooling fans 82 can also be configured for reversal of the airflow direction through the corresponding cooling unit 74. This can be accomplished using a reversible motor, or the blades can have a varying pitch to reverse the air flow direction. When the air is then flowing in the opposite direction, such that the inlet 84 is in fact the outlet of the cooling unit 74, then this flow of air can be used to clean the screen 78. Alternatively, the reverse flowing air can be used to clean and/or cool other parts of the combine 10. For example, referring to FIGS. 2 and 3, air flowing in a reverse direction 90 can be directed under the grain tank 28 toward the outer surface of the concaves for cleaning this area within the combine 10.

Turning now to FIG. 5, cooling unit 74 shown in FIG. 5 includes a stationary screen 78 and a rotating wand 88, however, it should be understood that the opposite could be true. Stationary screen 78 may be mounted to housing 72, as shown. The cooling unit 74 also includes an air baffle 122 that is non-rotatably connected to wand 88 by a shaft 125 such that air baffle 122 rotates along with wand 88, and vice versa. A motor 120 is connected to shaft 125 (or wand 88 or air baffle 122) by a transmission 121. Activating motor 120 causes simultaneous rotation of wand 88 and air baffle 122. Motor 120 may be hydraulic, electric or driven by a belt, for example. Wand 88 includes one or more openings 89 on the side facing screen 125, and a hollow interior that is fluidly connected to a suck-off fan 96 in the form of a vacuum pump via a duct 97 defining a hollow passage. Duct 97 is stationary and mounted to wand 88 by bearings (two shown). Alternatively, duct 97 may be mounted to shaft 125 or another component. It is noted that fan 96 may also be referred to herein as a vacuum pump.

Air baffle 122 may also be referred to herein as an "air delivery device."

A positive pressure pump 124 (i.e., compressor) is connected to a duct 126 for delivering a stream of air into duct 126. Pump 124 may be a fan, compressor, motor, compressed air source or any other device that is configured to deliver an air stream to duct 126. Duct 126 includes an outlet opening that registers with an inlet opening of air baffle 122. Duct 126 is stationary and mounted to air baffle 122 by bearings (two shown). Alternatively, duct 126 may be mounted to shaft 125 or another component. Air baffle 122 includes a hollow body, the aforementioned inlet opening and a series of outlet openings 123. Outlet openings 123 are disposed adjacent to screen 78 to deliver a stream or blade of high velocity air flow onto screen 78 for dislodging any debris remaining on screen 78. Outlet openings 123 may be configured to deliver a stream of air along (or parallel to) axis A (i.e., perpendicular or normal to screen 78). Alternatively, outlet openings 123 may be configured to deliver the stream of air at an angle of about 45 degrees relative to axis A. Because air baffle 122 is rotationally aligned with wand 88, the dislodged debris travels into (or toward) wand 88.

Air baffle 122 rotates along with wand 88 and is rotationally aligned with wand 88, such that air baffle 122 either limits or prevents the vacuum action of fan 96 from affecting the operation of cooling fan 82, and vice versa, since the air stream created by cooling fan 82 may travel in the opposite direction than the air stream created by fan 96.

In operation, suck-off fan 96 is activated along with motor 120, which causes wand 88 to rotate about axis A and suck-off any debris residing on screen 78. Debris that is suctioned from screen 78 travels through the interior of wand 88 and into duct 97 connected to fan 96. If further cleaning of screen 78 is required, as will be explained below, pump 124 is activated along with fan 96 and motor 120. Pump 124 delivers a stream of air into the hollow body of duct 126, which stream of air travels into air baffle 122 and exits the baffle at openings 123. The stream or blade of high velocity air flows onto screen 78 to dislodge the additional debris remaining on screen 78. And, that additional debris is suctioned through the interior of wand 88 and into duct 97 connected to fan 96.

Further cleaning of screen 78 may be required when air pressure sensors 98 detect a pressure differential on opposing sides of screen 78 that is above a pre-determined threshold value. Alternatively, cleaning of screen 78 may be required when fluid temperature sensor 106 of fluid cooler 80 detects a fluid temperature that is above a pre-determined threshold value. As another alternative, further cleaning of screen 78 may be performed routinely. For example, pump 124 may be operated for a pre-determined time period during (e.g., 2 minutes) during every operation of cooling unit 70. Alternatively, pump 124 may be operated continuously.

In the embodiment FIG. 5, the openings 123 are fixed to the body of air baffle 122 such that the nozzles cannot move relative to the air baffle 122. Turning now to FIGS. 7A and 7B, depicted is an alternative embodiment in which the nozzles 123' are moveable relative to the body of air baffle 122'. Specifically, the alternative cleaning unit 74' includes a system 700 for moving the nozzles 123' in a radial direction 701 (i.e., normal to axis A). By using moveable nozzles 123', the number of nozzles required is reduced as compared with stationary nozzles 123. Nozzles 123' are disposed on a manifold 702 that is translatable along radial direction 701. Air baffle 122' includes an elongated opening 708 that faces screen 78 and registers with nozzles 123'. The system 700 delivers pressurized air through the nozzles 123' and the opening 708 onto the screen 78.

System 700 is also shown schematically in FIG. 7B. System 700 generally includes positive pressure pump 124. Pump 124 is fluidly connected to deliver air to a valve 703. Valve 703 is fluidly connected to both a piston-cylinder type actuator 712 as well as manifold 702 such that, when open, valve 703 delivers pressurized air to both actuator 712 and manifold 702. Valve 703 is an electrically actuated pneumatic valve that is capable of cycling on and off.

The moveable piston 714 of actuator 712 is fixedly connected to a bracket 716. Bracket 716 is also fixedly connected to manifold 702 such that manifold 702 moves with piston 714 in the radial direction 701. Manifold 702 is mounted to one or more guides 720 that permit translation thereof. As best shown in FIG. 7B, a check valve 730 is fluidly connected between valve 703 and the cylinder of actuator 712. Check valve 730 includes an orifice to control the extension speed of the piston 714 in its cylinder. Check valve 730 also allows piston 714 to retract quickly when the compressed air supply is deactivated.

Alternatively, manifold 702 may be moved in radial direction 701 by an electric motor, for example, as opposed to pump 124.

As another alternative to the arrangement of FIG. 5 described above, the pump 124 may be connected to wand 88 to deliver an air stream through a different set of ports disposed in wand 88 that are fluidly isolated from opening 89. For that reason, and in that alternative arrangement, the wand 88 may be considered as an "air delivery device." Such an arrangement is shown in FIG. 8, which depicts an alternative wand 88' that is fluidly connected to vacuum pump 96 as well as positive pressure pump 124. Wand 88' includes an inlet opening 89 facing screen 78 as well as outlet openings 123" (one shown) formed on a wall of wand 88' and in fluid communication with opening 89 for directing air onto the screen 78. The outlet openings 123" are disposed at or near the trailing edge 802 of wand 88' (as viewed in the rotational direction 800 of wand 88') and are oriented at an acute angle relative to the planar surface of screen 78. Outlet openings 123" deliver an air stream 810 onto screen 78, which dislodges debris remaining on screen 78. And, that additional debris is suctioned through the opening 89 of wand 88' and into duct 97 connected to fan 96. The remaining arrows in FIG. 8 depict the direction of airflow through wand 88'. Wand 88' would be positioned in cooling unit 74 in the same position as wand 88.

As another alternative, item 96 could represent a positive pressure pump and item 124 could represent a vacuum pump to distribute the air flow in the opposite direction of the arrows shown in FIG. 5.

Turning now to FIG. 6 there is shown, in a schematic form, an aspiration system 92, having a controller 94 that is in communication with engine 32, cooling fan 82, motor 120 that rotates both wand 88 and air baffle 122, air baffle pump 124 that provides a positive pressure airflow to air baffle 122 for the removal of debris from screen 78, and suck-off fan 96 that provides a negative pressure airflow to wand 88 for the removal of debris from screen 78. Controller 94 may also be in communication with air pressure sensor(s) 98, a hydraulic pressure sensor 100, a torque sensor 102, an airflow sensor 104, a temperature sensor 106 for fluid cooler 80, a timer 108, an unload selector 110, a distance sensor 112 and a grain tank fill sensor 114.

The present invention may use a variable speed motor to drive the aspirator fan/fans 96 in order to actively change the speed of fan 96. This is done hydraulically to have a simple drive, compared to a potential complicated mechanical drive. The speed of fan 96 may be increased, for example, when pump 124 is operated. The '931 Publication describes other instances when it would be advantageous to adjust the speed of fan 96.

It is to be understood that the operational steps are performed by the controller 94 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 94 described herein is implemented in software code or instructions which are tangibly stored on a tangible computer readable medium. Upon loading and executing such software code or instructions by the controller 94, the controller 94 may perform any of the functionality of the controller 94 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

What is claimed is:

1. An aspiration system of an agricultural vehicle, the aspiration system comprising:
   a perforated screen that is configured to be positioned adjacent to an air-cooled fluid cooler;
   an air delivery device positioned on one side surface of the perforated screen, the air delivery device including a series of openings facing the perforated screen that directs air through the perforated screen to dislodge debris on the perforated screen; and
   a cooling fan that causes air to flow across the fluid cooler;
   wherein the air delivery device comprises a wand having a first passageway fluidly connected to a vacuum pump and a second passageway fluidly connected to a positive pressure pump; and
   wherein the second passageway comprises a nozzle positioned on a trailing portion of the wand as viewed in a direction of movement of the wand.

2. The aspiration system of claim 1, further comprising a controller that activates the positive pressure pump connected to the air delivery device, the positive pressure pump delivering air through the air delivery device.

3. The aspiration system of claim 2, further comprising either:
   pressure sensors positioned on opposing sides of the perforated screen, the sensors communicating pressure reading values to the controller,
   wherein the controller activates the positive pressure pump when the controller detects a pressure differential between the pressure reading values that exceeds a predetermined value; or
   a temperature sensor that monitors a fluid temperature within the fluid cooler of the agricultural vehicle, the temperature sensor communicating temperature reading values to the controller,
   wherein the controller activates the positive pressure pump when the temperature reading values exceed a predetermined temperature value.

4. The aspiration system of claim 2, wherein the controller activates the positive pressure pump for a predetermined amount of time during a cleaning cycle of the perforated screen.

5. The aspiration system of claim 1, wherein the openings of the air delivery device extend at an acute angle relative to the one side surface of the perforated screen.

6. The aspiration system of claim 1, further comprising the wand being positioned on an opposing side surface of the perforated screen.

7. The aspiration system of claim 6, wherein the wand is fluidly connected to the vacuum pump that suctions the debris off of the perforated screen, and the wand includes an inlet opening that receives the debris.

8. The aspiration system of claim 7, wherein the wand is non-rotatably connected to the air delivery device, enabling the air delivery device and the wand to rotate together.

9. The aspiration system of claim 8, wherein the series of openings of the air delivery device register with the inlet opening of the wand.

10. The aspiration system of claim 1, wherein the series of openings of the air delivery device extend normal to the one side surface of the perforated screen.

11. The aspiration system of claim 1, wherein the air delivery device rotates relative to the perforated screen and also translates in a radial direction relative to the perforated screen.

12. A combine harvester comprising an aspiration system that comprises:

a perforated screen positioned adjacent a fluid cooler;

an air delivery device positioned on one side surface of the perforated screen, the air delivery device including a series of openings facing the perforated screen that directs air through the perforated screen to dislodge debris on the perforated screen; and a cooling fan that causes air to flow across the fluid cooler;

wherein the air delivery device comprises a wand having a first passageway fluidly connected to a vacuum pump and a second passageway fluidly connected to a positive pressure pump; and wherein the second passageway comprises a nozzle positioned on a trailing portion of the wand as viewed in a direction of movement of the wand.

13. The combine harvester of claim 12, further comprising an engine and wherein the fluid cooler cools a fluid that circulates through the engine.

14. The combine harvester of claim 12, further comprising a rotor positioned at least partially within a concave; and wherein the cooling fan delivers air through the perforated screen and onto the concave.

\* \* \* \* \*